United States Patent
Yoon et al.

(10) Patent No.: US 11,881,213 B2
(45) Date of Patent: Jan. 23, 2024

(54) ELECTRONIC DEVICE, AND METHOD FOR CONTROLLING ELECTRONIC DEVICE

(71) Applicant: SAMSUNG ELECTRONICS CO., LTD., Suwon-si (KR)

(72) Inventors: Hyundon Yoon, Suwon-si (KR); Sangmoon Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/405,792

(22) Filed: Aug. 18, 2021

(65) Prior Publication Data
US 2021/0375275 A1 Dec. 2, 2021

Related U.S. Application Data

(63) Continuation of application No. PCT/KR2020/001689, filed on Feb. 6, 2020.

(30) Foreign Application Priority Data

Mar. 12, 2019 (KR) .................... 10-2019-0028271

(51) Int. Cl.
*G10L 15/20* (2006.01)
*G06F 3/16* (2006.01)
(Continued)

(52) U.S. Cl.
CPC .............. *G10L 15/20* (2013.01); *G06F 3/165* (2013.01); *G10L 15/22* (2013.01); *G10L 25/51* (2013.01); *H02J 9/005* (2013.01)

(58) Field of Classification Search
CPC ...... G06F 3/167; G06F 1/1605; G06F 1/1643; G06F 3/0412; G10L 15/22; G10L 25/51;
(Continued)

(56) References Cited

U.S. PATENT DOCUMENTS 9,875,081 B2 * 1/2018 Meyers ................... G10L 15/00
9,936,356 B2    4/2018 Jeong et al.
(Continued)

FOREIGN PATENT DOCUMENTS

JP          2014-56166 A    3/2014
KR    10-2014-0039709 A    4/2014
(Continued)

OTHER PUBLICATIONS

International Search Report (PCT/ISA/210) dated May 13, 2020 by the International Searching Authority in counterpart International Patent Application No. PCT/KR2020/001689.
(Continued)

*Primary Examiner* — Mohammad K Islam
(74) *Attorney, Agent, or Firm* — Sughrue Mion, PLLC

(57) ABSTRACT

A first electronic device includes an audio outputter; a communicator configured to transmit data to and receive data from a second electronic device; a memory storing one or more instructions; and at least one processor configured to execute the one or more instructions to: obtain an audio output level of an audio that is output through the audio outputter; obtain a spacing distance between the second electronic device and the first electronic device; based on the obtained audio output level and the obtained spacing distance, obtain a voice reception notification indicating whether a voice can be accurately received by the second electronic device, and control the communicator to transmit the obtained voice reception notification to the second electronic device.

10 Claims, 13 Drawing Sheets

(51) Int. Cl.
*G10L 15/22* (2006.01)
*G10L 25/51* (2013.01)
*H02J 9/00* (2006.01)

(58) Field of Classification Search
CPC .. G10L 19/018; G10L 15/20; H04M 1/72533; H04R 1/083; H04R 27/00
See application file for complete search history.

(56) References Cited

U.S. PATENT DOCUMENTS

| | | | |
|---|---|---|---|
| 9,953,654 | B2 | 4/2018 | Mun et al. |
| 10,219,102 | B2 | 2/2019 | Jang et al. |
| 10,408,928 | B2 | 9/2019 | Park et al. |
| 10,425,780 | B1 * | 9/2019 | Devaraj ................ G10L 15/22 |
| 10,425,781 | B1 * | 9/2019 | Devaraj ................ H04W 8/186 |
| 10,536,287 | B1 * | 1/2020 | Leblang ................ G10L 15/22 |
| 10,546,583 | B2 * | 1/2020 | White ................ G10L 15/28 |
| 10,685,652 | B1 * | 6/2020 | Cherukuri ............ G10L 25/51 |
| 10,701,067 | B1 * | 6/2020 | Ziraknejad .......... H04W 12/63 |
| 10,878,812 | B1 * | 12/2020 | Helwani .............. G10L 25/84 |
| 10,921,438 | B2 | 2/2021 | Jeon et al. |
| 11,069,364 | B1 * | 7/2021 | Souza .................. H04R 5/04 |
| 2012/0316876 | A1 | 12/2012 | Jang et al. |
| 2014/0195235 | A1 | 7/2014 | Cha et al. |
| 2016/0358614 | A1 * | 12/2016 | Phielipp .............. G10L 19/018 |
| 2017/0025124 | A1 * | 1/2017 | Mixter ................. G10L 15/32 |
| 2019/0012137 | A1 | 1/2019 | Lim et al. |
| 2019/0362715 | A1 * | 11/2019 | Aggarwal ............ G06F 3/1423 |
| 2021/0026593 | A1 * | 1/2021 | Wang ................... G10L 15/22 |
| 2022/0279063 | A1 * | 9/2022 | Coffman .............. G06F 3/167 |

FOREIGN PATENT DOCUMENTS

| | | |
|---|---|---|
| KR | 10-2015-0133586 A | 11/2015 |
| KR | 10-2016-0049347 A | 5/2016 |
| KR | 10-2017-0044419 A | 4/2017 |
| KR | 10-1730269 B1 | 4/2017 |
| KR | 10-2017-0105827 A | 9/2017 |
| KR | 10-2017-0139984 A | 12/2017 |
| KR | 10-2018-0023330 A | 3/2018 |
| KR | 10-2018-0071930 A | 6/2018 |
| KR | 10-2019-0006323 A | 1/2019 |
| KR | 10-2019-0014697 A | 2/2019 |
| KR | 10-2019-0017507 A | 2/2019 |
| WO | WO-2017044629 A1 * | 3/2017 ............ G06F 3/167 |

OTHER PUBLICATIONS

Written Opinion (PCT/ISA/237) dated May 13, 2020 by the International Searching Authority in counterpart International Patent Application No. PCT/KR2020/001689.

* cited by examiner

ELECTRONIC DEVICE, AND METHOD FOR CONTROLLING ELECTRONIC DEVICE

CROSS-REFERENCE TO RELATED APPLICATION(S)

This application is a bypass continuation of International Application No. PCT/KR2020/001689, filed on Feb. 6, 2020, which is based on and claims priority to Korean Patent Application No. 10-2019-0028271, filed on Mar. 12, 2019, in the Korean Intellectual Property Office, the disclosures of which are incorporated by reference herein in their entireties.

BACKGROUND

1. Field

The disclosure relates to an electronic device and a method for controlling to electronic device, and more particularly, to an electronic device and a method of determining a situation in which a user voice may be received to minimize battery drain.

2. Description of Related Art

An electronic device may provide various functions by establishing communication with another electronic device. For example, the electronic device may receive content(s) such as a moving image, a still image, text, or the like which is played back on the another electronic device and playback the received content, and may playback the content concurrently with other electronic devices.

In addition, the electronic device may provide a remote-control function for controlling a function of the another electronic device. A user may use the electronic device as a remote controller to select or playback content to be played back on the another electronic device.

Remote controllers equipped with voice recognition function are available. These remote controllers may include a separate voice recognition function activating button which activates the voice recognition function. Alternatively, these remote controllers may activate the voice recognition function in response to a utterance by the user.

In a case where the remote controller activates the voice recognition function in response to the user utterance, the remote controller is required to continuously receive ambient sound. Accordingly, battery consumption may progressing quickly.

SUMMARY

Provided are an electronic device and a method of determining a situation in which a user voice may be received to minimize battery drain.

According to an aspect of the disclosure, a first electronic device may include an audio outputter; a communicator configured to transmit data to and receive data from a second electronic device; a memory storing one or more instructions; and at least one processor configured to execute the one or more instructions to: obtain an audio output level of an audio that is output through the audio outputter; obtain a spacing distance between the second electronic device and the first electronic device; based on the obtained audio output level and the obtained spacing distance, obtain a voice reception notification indicating whether a voice can be accurately received by the second electronic device; and control the communicator to transmit the obtained voice reception notification to the second electronic device.

The at least one processor may be further configured to execute the one or more instructions to: obtain a lookup table that matches audio output levels of the audio that is output through the audio outputter, spacing distances between the first electronic device and the second electronic device, and audio input levels expected to be obtained through a microphone of the second electronic device based on the audio that is output by the audio outputter; store, in the memory, the lookup table; and obtain the voice reception notification indicating whether the voice can be accurately received by the second electronic device based on the audio output level, the spacing distance, and the lookup table.

The voice reception notification may include at least one from among an instruction instructing the second electronic device to turn-on or turn-off a microphone of the second electronic device, an instruction for activating or deactivating a voice reception function of the second electronic device, or an instruction for instructing the second electronic device to transmit a received voice to the first electronic device or ending the transmission.

The at least one processor may be further configured to execute the one or more instructions to obtain the spacing distance based on a signal strength of a signal produced by the second electronic device.

The at least one processor may be further configured to execute the one or more instructions to, based on a sound level obtained by the second electronic device, obtain the voice reception notification indicating whether the voice can be accurately received by the second electronic device.

The at least one processor may be further configured to execute the one or more instructions to, based on orientation information of the second electronic device, obtain the voice reception notification indicating whether the voice can be accurately received from the second electronic device.

The at least one processor may be further configured to execute the one or more instructions to control a display to output a guide according to the voice reception notification while transmitting the obtained voice reception notification to the second electronic device.

According to another aspect of the disclosure, a second electronic device configured to be in communication with a first electronic device, may include a communicator configured to transmit data to and receive data from the first electronic device; a microphone; a memory storing one or more instructions; at least one processor configured to store the one or more instructions to capture sound information by activating the microphone in response to a voice reception notification indicating that a voice can be accurately received by the second electronic device being received from the first electronic device through the communicator.

The at least one processor may be further configured to transmit the sound information captured by the microphone to the first electronic device in response to the voice reception notification indicating that the voice can be accurately received by the second electronic device being received from the first electronic device through the communicator.

The at least one processor may be further configured to control a display to output a guide according to the received voice reception notification.

According to another aspect of the disclosure, a method of controlling a first electronic device may include obtaining an audio output level of an audio that is output through an audio outputter of the first electronic device; obtaining a spacing distance between a second electronic device configured to transmit data to and receive data from the first electronic device; obtaining a voice reception notification indicating whether a voice can be accurately received by the second electronic device based on the obtained audio output level and the obtained spacing distance; and transmitting the obtained voice reception notification to the second electronic device.

The method may further include obtaining a lookup table by matching audio output levels of the audio that is output by the audio outputter, distances between the first electronic device and the second electronic device, and audio input levels expected to be obtained through a microphone of the second electronic device based on the audio that is output by the audio outputter; storing the lookup table; and obtaining, based on the audio output level, the spacing distance, and the lookup table, the voice reception notification indicating whether the voice can be accurately received by the second electronic device.

The voice reception notification may include at least one from among an instruction instructing the second electronic device to turn-on or turn-off a microphone of the second electronic device, an instruction instructing the second electronic device to activate or deactivate a voice reception function, or an instruction instructing the second electronic device to transmit a received voice to the first electronic device or ending the transmission.

The method may further include obtaining the spacing distance based on a signal strength of a signal produced by the second electronic device.

The method further may further include, based on a sound level obtained by the second electronic device, obtaining the voice reception notification indicating whether the voice can be accurately received the second electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
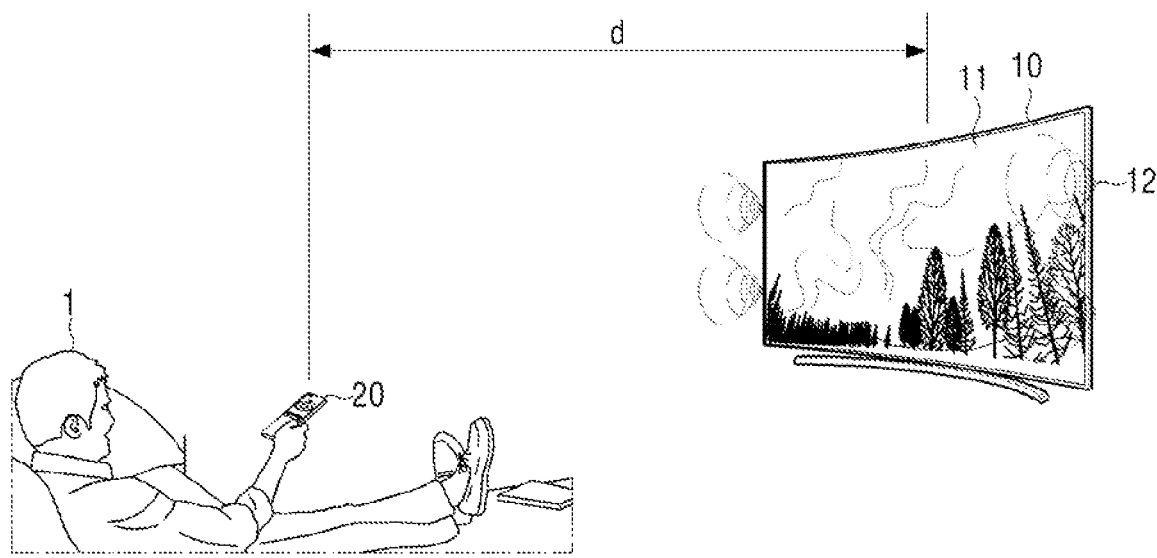
FIG. 1 is a diagram of a first electronic device transmitting a voice reception notification to a second electronic device according to an embodiment.

Embodiments of the disclosure will be described with reference to accompanied drawings below. However, the embodiments are not for limiting the technology described herein to a specific embodiment, and they should be interpreted as including all modifications, equivalents or alternatives of the embodiments disclosed herein. With respect to the description on the drawings, like reference numerals may be used to indicate like elements.

A skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having benefit of the description herein.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and B," "at least one of A or B," "one or more of A and B," or "one or more of A or B" may include all possible combinations of the items listed together. For example, "A or B," "at least one of A and B," or "at least one of A or B" may refer to all cases including (1) at least one A, (2) at least one B, or (3) both of at least one A and at least one B.

The expressions such as "first," "second," "1st," or "2nd" used herein may denote various elements, regardless of order and/or importance, and may be used to distinguish one element from another, without limiting the corresponding elements. For example, a first user device and a second user device may indicate different user devices, regardless of order and importance. For example, a first element may be denoted as a second element, and similarly a second element may also be denoted as a first element without departing from the scope of the disclosure.

The terms such as "module," "unit," or "part" used in the embodiments herein are terms used to denote an element which performs at least one function or operation, and the element may be implemented as a hardware or software, or a combination of hardware and software. Further, a plurality of "modules," a plurality of "units," or a plurality of "parts", except for when respective "modules," respective "units," or respective "parts" need to be implemented as individual specific hardware, may be integrated to at least one module or chip and implemented in at least one processor.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element). On the other hand, when a certain element (e.g., first element) is indicated as "directly coupled with/to" or "directly connected to" another element (e.g., second element), it may be understood as another element (e.g., third element) not being present between the certain element and the other element.

The terms used herein have merely been used to describe a specific embodiment, and not to limit the scope of another embodiment. A singular expression includes a plural expression, unless otherwise specified. The terms used in the disclosure, including technical or scientific terms, may have the same meaning as the terms generally understood by those of ordinary skill in the related field of art. Of the terms used herein, the terms which are defined in a typical dictionary may be interpreted to meanings identical or similar to the contextual meanings thereof in the related art. Unless clearly defined otherwise, the terms may not be interpreted to ideal or excessively formal meanings. In some cases, even if the term is defined in the disclosure, the terms may not be interpreted to exclude the embodiments of the disclosure.

FIG. 1 is a diagram of a first electronic device transmitting a voice reception notification to a second electronic device according to an embodiment.

As shown in FIG. 1, a first electronic device 10 may be an image display device (e.g., television (TV)) configured to process an image signal received externally, and capable of visually displaying a processed image, but is no limited thereto, and may be implemented as a device including a memory and a processor. For example, the first electronic device 10 may be implemented as a variety of image display devices such as, for example, and without limitation, a mobile phone, a smart phone, a tablet personal computer (PC), a digital camera, a camcorder, a laptop computer, a tablet PC, a desktop PC, an e-book reader, a terminal for digital broadcasting, a personal digital assistant (PDA), a portable multimedia player (PMP), an MP3 player, a wearable device, or the like.

According to one or more embodiments, the first electronic device 10 may not include a display 11. For example, the first electronic device 10 may be an electronic device configured to process an image signal received externally, and transmit the processed image signal to an external display device by using a separate interface (e.g., high definition multimedia interface (HDMI), display port (DP), etc.).

According to an embodiment, a second electronic device 20 may be configured to provide users with various functions through an app (or, application program; e.g., alarm app, photo (gallery) app, moving image playback app, etc.) stored internally.

According to one or more embodiments, the second electronic device 20 may include a touchscreen display with a screen smaller than the first electronic device 10, and may be gripped by a user 1, and may be mobile.

According to an embodiment, the first electronic device 10 and the second electronic device 20 may be configured to use a communication module included in the respective devices and may be in a state of having established communication. The first electronic device 10 and the second electronic device 20 may be configured to establish communication directly, or establish communication through a third device (e.g., gateway, home server, etc.).

According to an embodiment, the first electronic device 10 and the second electronic device 20 may be configured to establish a communication network by using a wired or wireless communication method. The first electronic device 10 and the second electronic device 20 may include a wireless communicator (e.g., a cellular communication module, a short-range wireless communication module, or a global navigation satellite system (GNSS) communication module) or a wired communicator (e.g., a local area network (LAN) communication module, or a power line communication module), and may be configured to use the corresponding communicator therefrom to communicate with each other or with another electronic device through a first network (e.g., a short-range communication network such as Bluetooth, WiFi direct or infrared data association (IrDA)) or a second network (e.g., long-range communication network such as cellular network, internet, or computer network (e.g., LAN or WAN)).

According to an embodiment, the user 1 may use the second electronic device 20 to control a function of the first electronic device 10. For example, the user 1 may use the second electronic device 20 and turn-on or turn-off the first electronic device 10. Alternatively, the user 1 may use the second electronic device 20 to change content which is played back in the first electronic device 10 or control an audio volume which is output by the first electronic device 10.

According to an embodiment, the first electronic device 10 may obtain an audio output level being output by the first electronic device 10.

Referring to FIG. 1, the first electronic device 10 may include a speaker 12 for outputting audio included in a media content which is played back in the display 11. The first electronic device 10 may include at least one speaker 12. The first electronic device 10 may output an audio included in a media content by using the speaker 12. In this case, the first electronic device 10 may obtain data on the audio output level being output through the speaker 12.

According to an embodiment, the first electronic device 10 may control the audio output level included in the media content to a digital level of between −1 and +1.

According to an embodiment, the first electronic device 10 may include a database in which the digitalized audio output level, the distance between the first electronic device 10 and the second electronic device 20, and the audio input level (or, audio volume) expected to be obtained through the microphone included in the second electronic device 20 are matched and stored. Through the above, the first electronic device 10 may obtain the audio input level expected to be obtained by the second electronic device 20 when audio is output to a specific level from a specific distance.

According to an embodiment, the first electronic device 10 may obtain a spacing distance d between the second electronic device 20 which established communication with the first electronic device 10 and the first electronic device 10.

Referring to FIG. 1, the first electronic device 10 and the second electronic device 20 may be in a state in which communication is established by using Bluetooth. The first electronic device 10 may use the Bluetooth signal strength between the first electronic device 10 and the second electronic device 20 to obtain the spacing distance d between the first electronic device 10 and the second electronic device 20.

However, the method of the first electronic device 10 obtaining the spacing distance d between the first electronic device 10 and the second electronic device 20 is not limited to the above. For example, the first electronic device 10 and the second electronic device 20 may obtain the spacing distance d between each other by transmitting and receiving a non-audible audio. The first electronic device 10 may obtain the spacing distance d between the first electronic device 10 and the second electronic device 20 through various other methods.

According to an embodiment, the first electronic device 10 may match the obtained audio output level and the obtained spacing distance d with second electronic device 20 with the audio output level, the spacing distance between the first electronic device 10 and the second electronic device 20, and the audio input level expected to be obtained through the microphone included in the second electronic device 20 to apply to the database stored as a lookup table, and obtain the voice reception notification in which the voice reception possibility of the second electronic device 20 is determined.

The voice reception notification may include, for example, an instruction to cause the second electronic device 20 to turn-on or turn-off the microphone included in the second electronic device 20. Alternatively, the voice reception notification may include an instruction to cause the second electronic device 20 to activate or deactivate the voice receipt function. Alternatively, the voice reception notification may include an instruction instructing to transmit the received voice to the first electronic device 10 or an instruction ending the transmission of the received voice to the first electronic device 10.

For example, the first electronic device 10 may use the lookup table, and based on the spacing distance of the first electronic device 10 and the second electronic device 20 being d and the audio output level of the first electronic device 10 being 70 dB, identify the second electronic device 20 as having obtained an audio of about 40 dB. Based on the voice of the user 1 obtained on average by the second electronic device 20 being 60 dB, the first electronic device 10 may identify that a level difference of the user voice obtained by the second electronic device 20 and the audio output from the first electronic device 10 is 20 dB.

The first electronic device 10 may identify, based on an input level difference of the user voice obtained by the second electronic device 20 and the audio expected to be obtained by the second electronic device 20 exceeding 20 dB, that the second electronic device 20 is in a state capable of accurate voice reception and obtain the voice reception notification including information that the second electronic device 20 is currently capable of voice reception.

According to one or more embodiments, the first electronic device 10 may, based on a level difference of the user voice obtained by the second electronic device 20 and the audio output from the first electronic device 10 not exceeding 20 dB, identify that the second electronic device 20 is in a state incapable of accurate voice reception, and obtain the voice reception notification which includes information that the second electronic device 20 is currently incapable of voice reception.

According to an embodiment, the first electronic device 10 may transmit the obtained voice reception notification to the second electronic device 20. The second electronic device 20 may turn on/off the microphone, or activate/deactivate the voice reception function based on the received voice reception notification.

For example, the first electronic device 10 may turn-on the microphone or activate the voice reception function in response to the voice reception notification which includes information that voice reception is possible.

According to one or more embodiments, the first electronic device 10 may output, based on the second electronic device 20 being identified as in state in which voice reception is possible, a guide guiding the user that it is in a state capable of voice reception. For example, the first electronic device 10 may display a text or icon corresponding to a content of the guide in one area of the display 11. Alternatively, the first electronic device 10 may generate and output a voice corresponding to the guide content.

According to one or more embodiments, the second electronic device 20 may output, based on a voice reception possibility including information that voice reception is possible being obtained, a guide guiding the user that it is in a state capable of voice reception. For example, the second electronic device 20 may use an LED included in the second electronic device 20 to output a specific color corresponding to the guide. Alternatively, the second electronic device 20 may activate a color outputter included in the second electronic device 20 to guide the user that it is in a state capable of voice reception. Alternatively, the second electronic device 20 may display a notification including information that voice reception is possible in the display 11.

Accordingly, according to an embodiment of the display, the first electronic device 10 may determine a duration for the second electronic device 20 to be in standby in order to obtain the voice uttered by the user 1. Based on the above, the second electronic device 20 may use the battery effectively.

Figure 2:
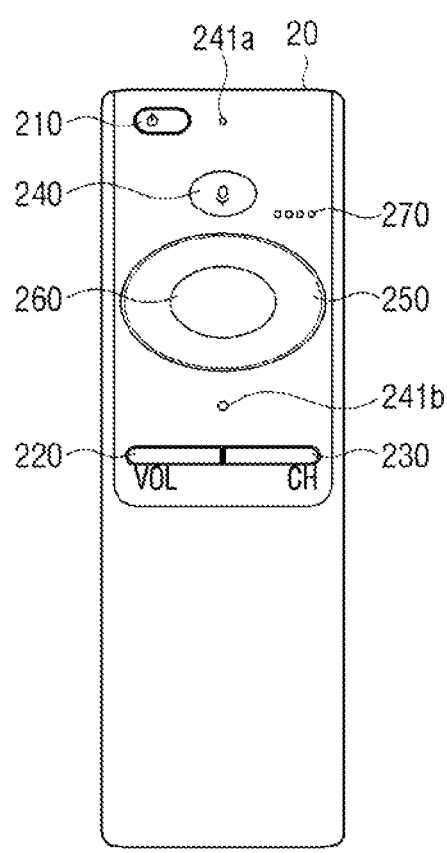
FIG. 2 is a diagram of a second electronic device according to an embodiment.

FIG. 2 is a diagram showing a second electronic device according to an embodiment. According to one or more embodiments, the second electronic device 20 may be a remote controller configured to control the first electronic device 10.

According to one or more embodiments, the second electronic device 20 may include a plurality of input buttons. For example, the second electronic device 20 may include a power button 210 configured to turn on/off a power of the first electronic device 10, a volume control button 220 configured to control an output volume of the first electronic device 10, a channel change button 230 configured to change a source of a content being played back in the first electronic device 10, a microphone execution button 240 configured to execute the microphone which supports voice input, a wheel button 250 configured to select a different function button of the first microphone 241a and a second microphone 241b and then control a level of the corresponding function, a color outputter 260, and a speaker 270. The second electronic device 20 may further include a processor, a communicator, and a memory.

According to an embodiment, the user may be able to control the volume as the wheel button 250 rotates in a clockwise direction or an counterclockwise direction after the volume control button 220 is pressed. For example, when the wheel button 250 is rotated in the clockwise direction, the volume of the first electronic device 10 may be increased, and when the wheel button 250 is rotated in the counterclockwise direction, the volume of the first electronic device 10 may be decreased.

According to an embodiment, the user may change the channel as the wheel button 250 is rotated in the clockwise direction or the counterclockwise direction after the channel change button 230 is pressed. For example, when the wheel button 250 is rotated in the clockwise direction, a number corresponding to a channel may be increased, and when the wheel button 250 is rotated in the counterclockwise direction, the number corresponding to the channel may be decreased.

According to one or more embodiments, the wheel button 250 may perform the function of a four direction button. For example, the user may, after pressing the volume control button 220, press a top part or a right part of the wheel button 250 and increase the volume of the first electronic device 10. Alternatively, the user may, after pressing the volume control button 220, press a bottom part or a left part of the wheel button 250 and decrease the volume of the first electronic device 10.

According to one or more embodiments, the user may, after pressing the channel change button 230, press the top part or the right part of the wheel button 250 and increase the number corresponding to the channel. Alternatively, the user may, after pressing the channel change button 230, press the bottom part or the left part of the wheel button 250 and decrease the number corresponding to the channel.

According to an embodiment, a center part of the wheel button 250 may include the color outputter 260 which outputs color. The second electronic device 20 may display a color in the color outputter 260 and guide the user that it is in a state capable of voice reception.

According to one or more embodiments, the wheel button 250 may include an opaque material, and may include a color light emitting module at a lower end part of the wheel button 250 so as to output color. In this case, the second electronic device 20 may use the color outputter 260 and the wheel button 250 to guide the user that it is in a state capable of voice reception.

According to one or more embodiments, the second electronic device 20 may include a vibration module (or a haptic module).

Figure 3:
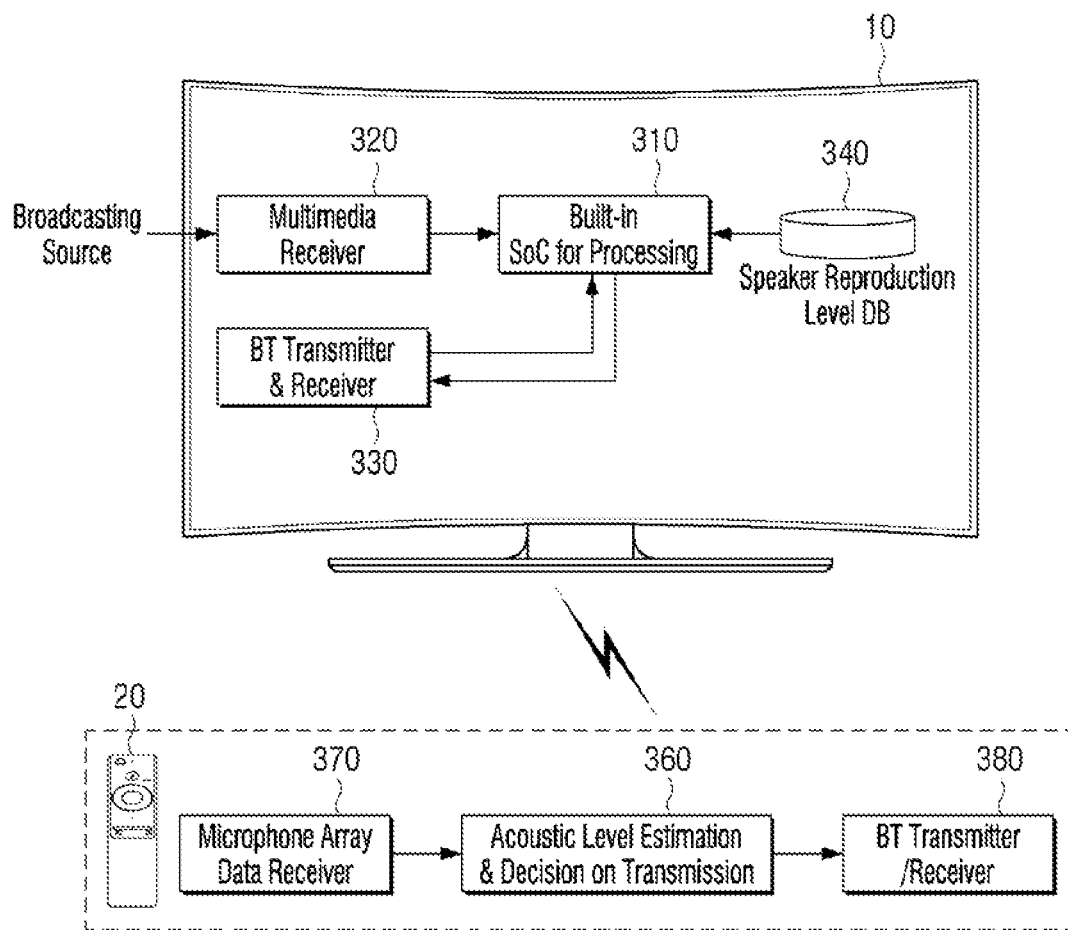
FIG. 3 is a schematic block diagram of a first electronic device and a second electronic device according to an embodiment.

FIG. 3 is a schematic block diagram showing a first electronic device and a second electronic device according to an embodiment.

Referring to FIG. 3, the first electronic device 10 may include a Built-in system on chip (SoC) for processing 310, a Multimedia Receiver 320, a BT Transmitter & Receiver 330, and a Speaker Reproduction Level DB 340. However, the embodiment is not limited thereto. The first electronic device 10 may further include elements, or may not include a portion of the elements.

According to an embodiment, the Multimedia Receiver 320 may receive a broadcasting source which is received from an external device. The Built-in SoC for processing 310 may use the broadcasting source being transmitted through the Multimedia Receiver 320 and play back the media content. In this case, the Built-in SoC for processing 310 may identify the audio output level included in the media content. In addition, the Built-in SoC for processing 310 may control the identified audio output level to a digital level of between −1 and +1.

According to an embodiment, the Speaker Reproduction Level DB 340 may store data which matched the digitalized audio output level, the distance between the first electronic device 10 and the second electronic device 20, and the audio input level expected to the obtained through the microphone included in the second electronic device 20 with the lookup table.

According to an embodiment, the BT Transmitter & Receiver 330 may transmit a Bluetooth signal to an external device, or receive a Bluetooth signal received from an external device based on the control of the Built-in SoC for processing 310.

According to an embodiment, the Built-in SoC for processing 310 may use the strength of the Bluetooth signal between the first electronic device 10 and the second electronic device 20 and obtain the spacing distance between the first electronic device 10 and the second electronic device 20.

According to an embodiment, the Built-in SoC for processing 310 may apply the obtained audio output level and the obtained spacing distance with the second electronic device 20 to the Speaker Reproduction Level DB 340 and obtain an audio input level expected to be obtained through the Microphone Array Data Receiver 370 included in the second electronic device 20.

According to an embodiment, the first electronic device 10 may match the obtained audio output level and the obtained spacing distance with the second electronic device 20 with the digitalized audio output level and the audio input level expected to be obtained through the microphone included in the second electronic device 20, and reference to the stored database to obtain a voice reception notification in which the voice reception possibility of the second electronic device 20 is indicated.

According to an embodiment, the Built-in SoC for processing 310 may control the BT Transmitter & Receiver 330 to transmit the obtained voice reception notification to the second electronic device 20.

Figure 13:
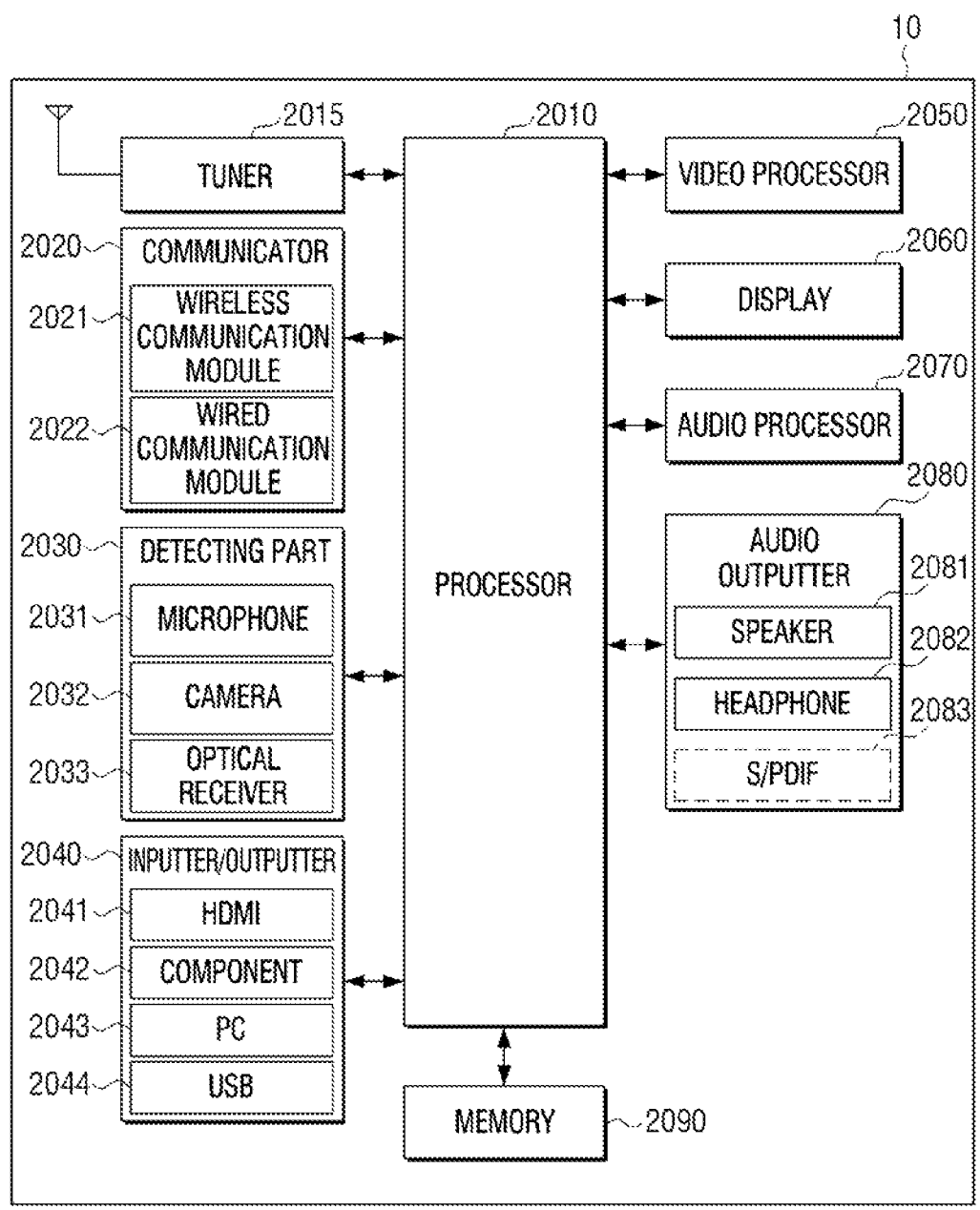
FIG. 13 is a block diagram of a first electronic device according to one or more embodiments of the disclosure.

According to one or more embodiments, the Built-in SoC for processing 310 may correspond to a processor (e.g., processor 2010 of FIG. 13), the Multimedia Receiver 320 may correspond to a tuner (e.g., tuner 2015 of FIG. 13), the BT Transmitter & Receiver 330 may correspond to a communicator (e.g., communicator 2020 of FIG. 13), and the Speaker Reproduction Level DB 340 may correspond to a memory (e.g., memory 2090 of FIG. 13).

According to an embodiment, the second electronic device 20 may include an Acoustic Level Estimation & Decision on Transmission 360, a Microphone Array Data Receiver 370, and a BT Transmitter & Receiver 380. However, the embodiment is not limited thereto. The second electronic device 20 may further include elements, or may not include a portion of the elements.

According to an embodiment, the Microphone Array Data Receiver 370 may obtain a sound generated in the surroundings of the second electronic device 20. The sound may include, for example, the user voice, environmental sounds of the surroundings, and the like.

According to an embodiment, the BT Transmitter & Receiver 380 may transmit the Bluetooth signal to the external device, or receive the Bluetooth signal received from the external device based on the control of the Acoustic Level Estimation & Decision on Transmission 360.

According to an embodiment, the Acoustic Level Estimation & Decision on Transmission 360 may derive a level of sound obtained through the Microphone Array Data Receiver 370. In addition, the Acoustic Level Estimation & Decision on Transmission 360 may control the BT Transmitter & Receiver 380 to transmit the sound obtained through the Microphone Array Data Receiver 370 to the first electronic device 10 according to the voice reception notification received from the first electronic device 10.

According to one or more embodiments, the Acoustic Level Estimation & Decision on Transmission 360 may correspond to the processor, the Microphone Array Data Receiver 370 may correspond to the microphone, and the BT Transmitter & Receiver 380 may correspond to the communicator.

Figure 4:
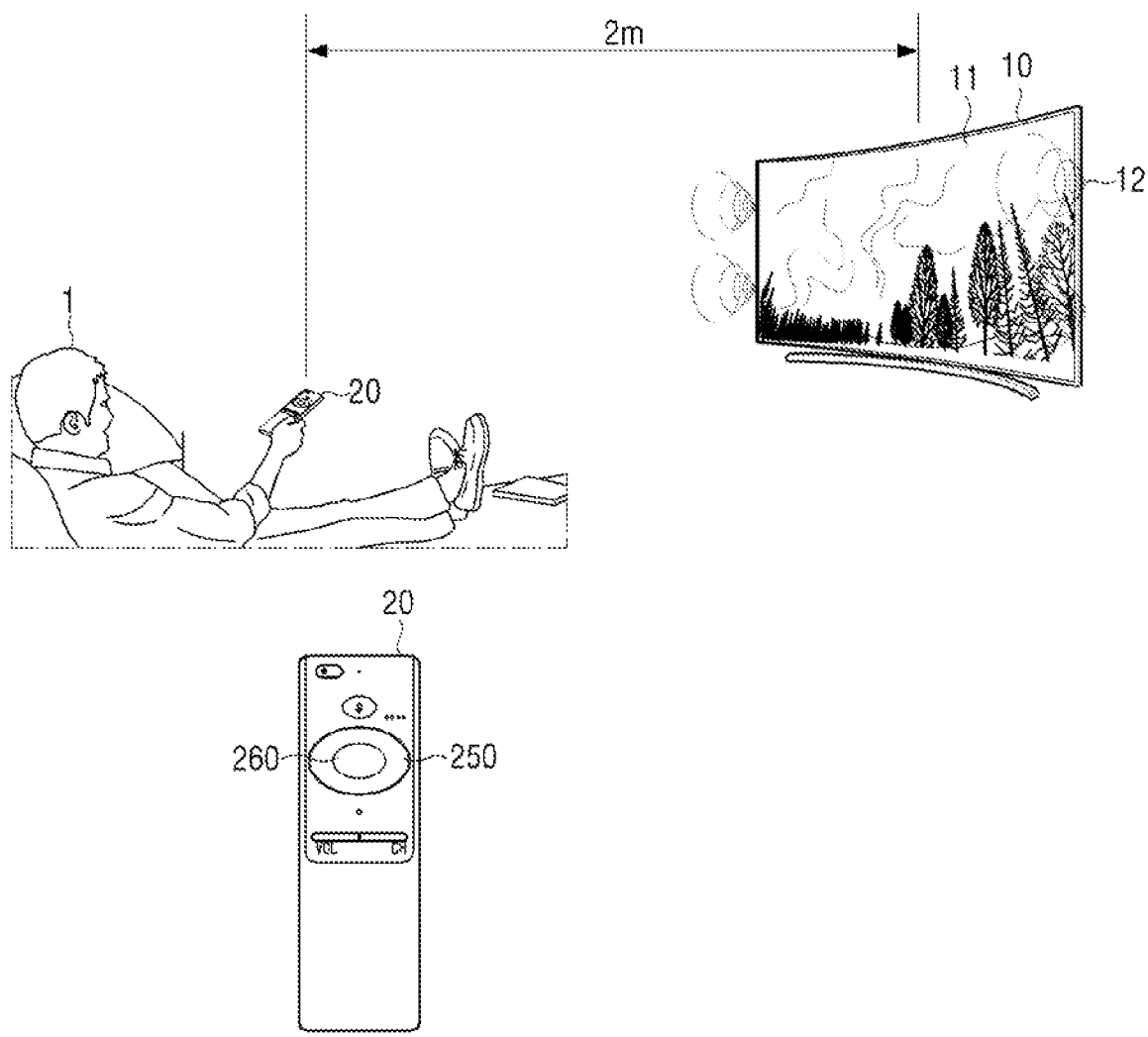
FIG. 4 is a diagram of a first electronic device transmitting a voice reception notification which includes information that voice reception is possible to a second electronic device according to an embodiment.

FIG. 4 is a diagram showing a situation of a first electronic device transmitting a voice reception notification which includes information that voice reception is possible to a second electronic device according to an embodiment.

Referring to FIG. 4, the first electronic device 10 may obtain data on the output level of audio being output through the speaker included in the first electronic device 10.

According to an embodiment, the first electronic device 10 may control the audio output level included in the media content to a digital level of between −1 and +1. The first electronic device 10 may control, for example, the audio output level included in the media content to be 0.5.

According to an embodiment, the first electronic device 10 may include the database in which the digitalized audio output level, the spacing distance between the first electronic device 10 and the second electronic device 20, and the audio input level expected to be obtained through the microphone included in the second electronic device 20 are matched and stored as the lookup table. Through the above, the first electronic device 10 may obtain the audio input level obtained by the second electronic device 20 when audio of a specific volume is output from a specific distance.

For example, the lookup table may match the audio input level expected to be obtained by the second electronic device 20 as 60 dB based on the spacing distance between the first electronic device 10 and the second electronic device 20 being 1 m when the audio output level is 0.5. Alternatively, the lookup table may match the audio input level expected to be obtained by the second electronic device 20 as 50 dB based on the spacing distance between the first electronic device 10 and the second electronic device 20 being 2 m when the audio output level is 0.5.

According to an embodiment, the first electronic device 10 may obtain the spacing distance between the second electronic device 20 which established communication with the first electronic device 10 and the first electronic device 10. For example, the first electronic device 10 may use the strength of the Bluetooth signal between the first electronic device 10 and the second electronic device 20 and obtain the spacing distance between the first electronic device 10 and the second electronic device 20.

Referring to FIG. 4, the first electronic device 10 may use the lookup table to determine that the audio input level expected to be obtained by the second electronic device 20 as 50 dB based on the audio output level being 0.5 and the spacing distance between the first electronic device 10 and the second electronic device 20 being 2 m.

According to an embodiment, the first electronic device 10 may use the obtained audio output level and the spacing distance with the second electronic device 20 to obtain the voice reception notification in which the voice reception possibility of the second electronic device 20 is determined.

For example, the first electronic device 10 may identify that the level difference of the user voice obtained by the second electronic device 20 and the audio output from the first electronic device is 20 dB based on the audio input level expected to be obtained by the second electronic device 20 being 50 dB, and the voice of the user 1 obtained on average by the second electronic device 20 being 70 dB.

The first electronic device 10 may identify that the second electronic device 20 is in a state capable of accurate voice reception based on an input level difference of the user voice obtained by the second electronic device 20 and the audio expected to be obtained by the second electronic device 20 being 20 dB, and the second electronic device 20 may obtain the voice reception notification which includes information that voice reception is currently possible. The voice reception notification may include content, for example, instructing the second electronic device 20 to turn-on the microphone, or instructing to activate the voice reception function, or instructing to transmit the received voice to the first electronic device.

The first electronic device 10 may transmit the obtained voice reception notification to the second electronic device 20.

According to an embodiment, the first electronic device 10 may display a text, an icon, or the like notifying that it is in a state capable of voice reception in one area of the display based on the second electronic device 20 being in a state capable of voice reception. Alternatively, the first electronic device 10 may generate and output a voice notifying that it is in a state capable of voice reception.

According to an embodiment, the second electronic device 20 may output, based on receiving the voice reception notification notifying that voice reception is possible, a pre-set color to the color outputter 260, the wheel button 250, or the like and guide the user that it is in a state capable of voice reception.

Figure 5:
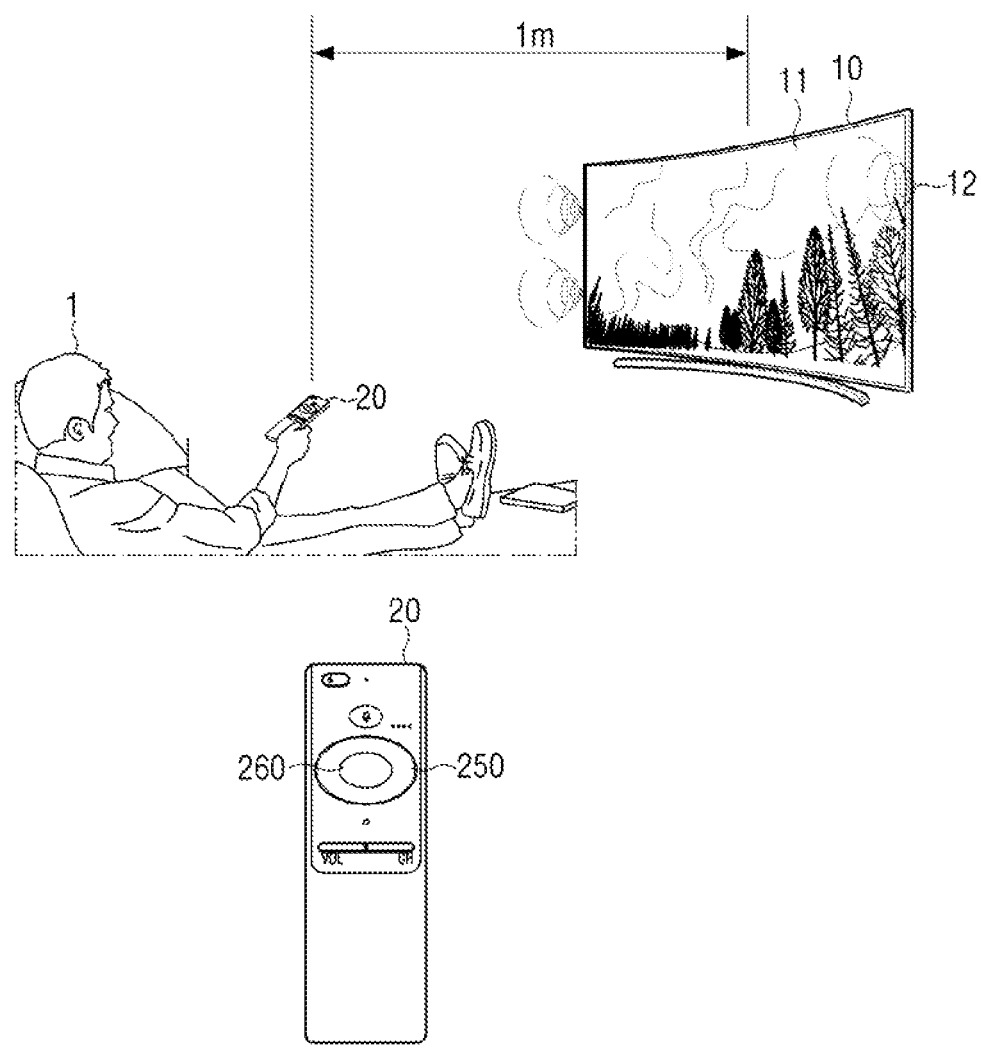
FIG. 5 is a diagram of a first electronic device transmitting a voice reception notification which includes information that voice reception is not possible to a second electronic device according to an embodiment.

FIG. 5 is a diagram showing a situation of a first electronic device transmitting a voice reception notification which includes information that voice reception is not possible to a second electronic device according to an embodiment.

Referring to FIG. 5, the first electronic device 10 may obtain data on the audio output level being output through the speaker 12 included in the first electronic device 10.

According to an embodiment, the first electronic device 10 may control the audio output level included in the media content to a digital level of between −1 and +1. The first electronic device 10 may control the audio output level included in the media content to, for example, 0.5.

According to an embodiment, the first electronic device 10 may include a database in which the digitalized audio output level, the spacing distance between the first electronic device 10 and the second electronic device 20, and the audio input level expected to be obtained through the microphone included in the second electronic device 20 are matched and stored as the lookup table. Through the above, the first electronic device 10 may obtain, based on an audio of a specific volume being output from a specific distance, the audio input level obtained by the second electronic device 20.

For example, the lookup table may match the audio input level expected to be obtained by the second electronic device 20 as 60 dB based on the spacing distance between the first electronic device 10 and the second electronic device 20 being 1 m when the audio output level is 0.5. Alternatively, the lookup table may match the audio input level expected to be obtained by the second electronic device 20 as 50 dB based on the spacing distance between the first electronic device 10 and the second electronic device 20 being 2 m when the audio output level is 0.5.

According to an embodiment, the first electronic device 10 may obtain the spacing distance between the second electronic device 20 which established communication with the first electronic device 10 and the first electronic device 10. For example, the first electronic device 10 may use the strength of the Bluetooth signal between the first electronic device 10 and the second electronic device 20 to obtain the spacing distance between the first electronic device 10 and the second electronic device 20.

Referring to FIG. 5, the first electronic device 10 may use the lookup table to determine that the audio input level expected to be obtained by the second electronic device 20 as 60 dB based on the audio output level being 0.5, and the spacing distance between the first electronic device 10 and the second electronic device 20 being 1 m.

According to an embodiment, the first electronic device 10 may use the spacing distance with the obtained audio output level and the second electronic device 20 to obtain the voice reception notification in which the voice reception possibility of the second electronic device 20 is determined.

For example, the first electronic device 10 may identify that the level difference of the user voice obtained by the second electronic device 20 and the and the audio output from the first electronic device 10 is 10 dB based on the audio input level expected to be obtained by the second electronic device 20 being 60 dB, and the voice of the user 1 obtained on average by the second electronic device 20 being 70 dB.

The first electronic device 10 may identify that the second electronic device 20 is in a state incapable of receiving accurate voice reception based on the input level difference of the user voice obtained by the second electronic device 20 and the audio expected to be obtained by the second electronic device 20 being 10 dB, and the second electronic device 20 may obtain the voice reception notification which includes information that voice reception is currently not possible.

The first electronic device 10 may transmit the obtained voice reception notification to the second electronic device 20.

According to an embodiment, the first electronic device 10 may display a text, an icon, or the like notifying that it is in a state incapable of voice reception in one area of the display 11 based on the second electronic device 20 being in a state incapable of voice reception. Alternatively, the first electronic device 10 may generate and output a voice notifying that it is in a state incapable of voice reception.

According to an embodiment, the second electronic device 20 may output, based on a voice reception notification notifying that it is in a state incapable of voice reception being received, a pre-set color to the color outputter 260, the wheel button 250, or the like and guide the user that it is in a state incapable of voice reception.

According to one or more embodiments, the first electronic device 10 or the second electronic device 20 may not output the guide notifying that it is in a state incapable of voice reception when the second electronic device 20 is in a state incapable of voice reception. That is, in this case, the first electronic device 10 or the second electronic device 20 may not output any guide regardless of the state capable of voice reception.

As described above, according to one or more embodiments of the disclosure, the first electronic device 10 may generate a notification on whether the second electronic device 20 is in a situation capable of receiving the user voice and transmit to the second electronic device 20. Accordingly, the second electronic device 20 may operate the microphone only in a situation capable of voice reception, or activate the voice reception function to effectively use the battery.

In addition, according to one or more embodiments of the disclosure, the second electronic device 20 may receive the user voice with input of the user pressing the microphone execution button 240.

Figure 6:
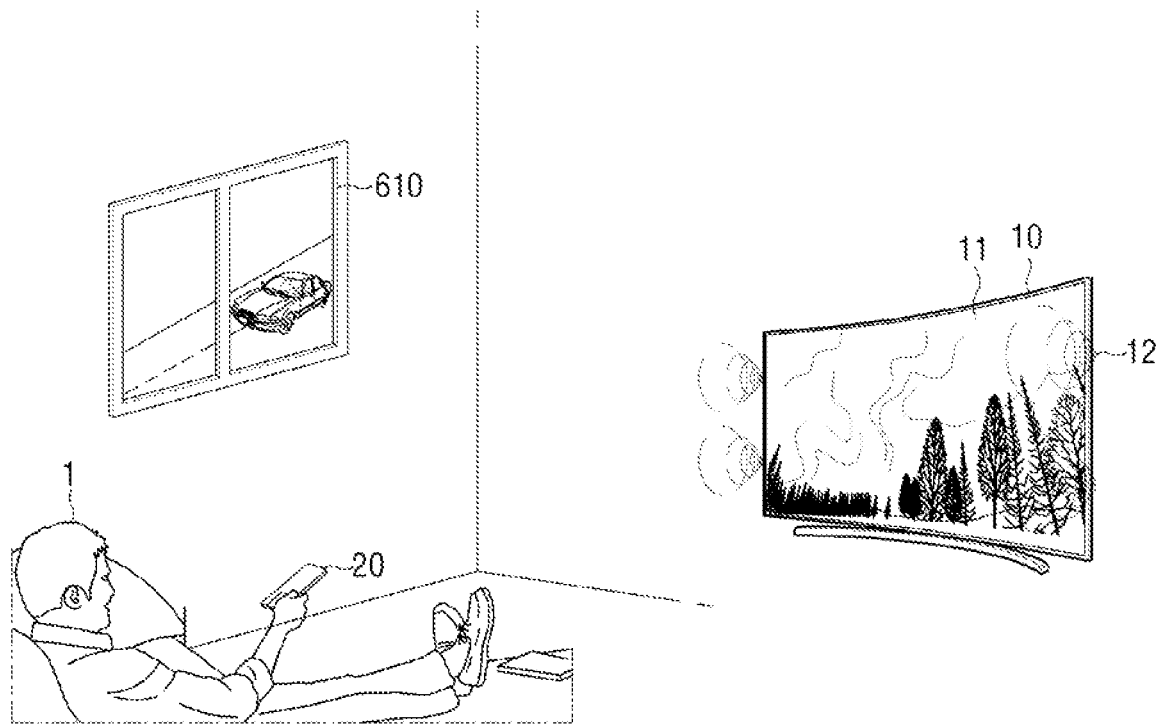
FIG. 6 is a diagram of a first electronic device determining whether a voice reception notification was received based on data received from a second electronic device according to an embodiment.

FIG. 6 is a diagram showing a situation of a first electronic device determining whether a voice reception notification was received based on data received from a second electronic device according to an embodiment.

Referring to FIG. 6, the first electronic device 10 may control the audio output level included in the media content to a digital level between −1 and +1. The first electronic device 10 may control, for example, the audio output level included in the media content to 0.5.

According to an embodiment, the first electronic device 10 may include the database in which the digitalized audio output level, the spacing distance between the first electronic device 10 and the second electronic device 20, and the audio input level expected to be obtained through the microphone included in the second electronic device 20 are matched and stored as the lookup table. Through the above, the first electronic device 10 may obtain, based on an audio of a specific volume being output from a specific distance, the audio input level obtained by the second electronic device 20.

Referring to FIG. 6, the first electronic device 10 may use the lookup table to determine that the audio input level expected to be obtained by the second electronic device 20 as 50 dB based on the audio output level being 0.5, and the spacing distance between the first electronic device 10 and the second electronic device 20 being 2 m.

According to an embodiment, the first electronic device 10 may use the obtained audio output level and the spacing distance with the second electronic device 20 to obtain the voice reception notification in which the voice reception possibility of the second electronic device 20 is determined.

For example, the first electronic device 10 may identify that the level difference of the user voice obtained by the second electronic device 20 and the audio expected to be obtained by the second electronic device 20 is 20 dB based on the volume of the audio expected to be obtained by the second electronic device 20 being 50 dB, and the voice of the user 1 obtained on average by the second electronic device 20 being 70 dB.

According to an embodiment, the second electronic device 20 may identify the orientation (or location) of the second electronic device 20. For example, the second electronic device 20 may further include a sensor part configured to identify the orientation (or location) or the like, such as a gyro sensor and an acceleration sensor, and may identify the orientation (or location) of the second electronic device 20 based on a sensing value of the sensing part.

Referring to FIG. 6, the second electronic device 20 may identify that a surface on which the microphone is provided is facing down (or away from the user) based on the sensing value of the sensor part. The second electronic device 20 may transmit information related to the current orientation of the second electronic device to the first electronic device 10.

According to an embodiment, the first electronic device 10 may identify that the second electronic device 20 is in a state incapable of accurate voice reception based on a level difference of the user voice obtained by the second electronic device 20 and the audio expected to be obtained by the second electronic device 20 being 20 dB and the surface on which the microphone of the second electronic device 20 is provided is facing the down. The first electronic device 10 may transmit the voice reception notification including information that voice reception is not possible for the second electronic device 20.

According to one or more embodiments, the second electronic device 20 may identify the audio level received through the microphone.

Referring to FIG. 6, the second electronic device 20 may identify that a sound of 60 dB is currently being received through the microphone. For example, the second electronic device 20 may identify as a sound of 60 dB being received by combining the audio received from the first electronic device 10 and the external noise received through a window 610 adjacent with the second electronic device 20.

The second electronic device 20 may transmit information guiding that the second electronic device 20 is receiving a sound of 60 dB to the first electronic device 10.

According to an embodiment, the first electronic device 10 may identify that the second electronic device is in a state incapable of accurate voice reception based on a level difference of the user voice obtained by the second electronic device 20 and the audio expected to be obtained by the second electronic device 20 being 20 dB and the second electronic device 20 is currently receiving a sound of 60 dB. The first electronic device 10 may transmit the voice reception notification which includes information that voice reception is currently not possible for the second electronic device 20.

As described above, according to an embodiment of the disclosure, the first electronic device 10 may generate the voice reception notification based on the various data received from the second electronic device 20.

Figure 7:
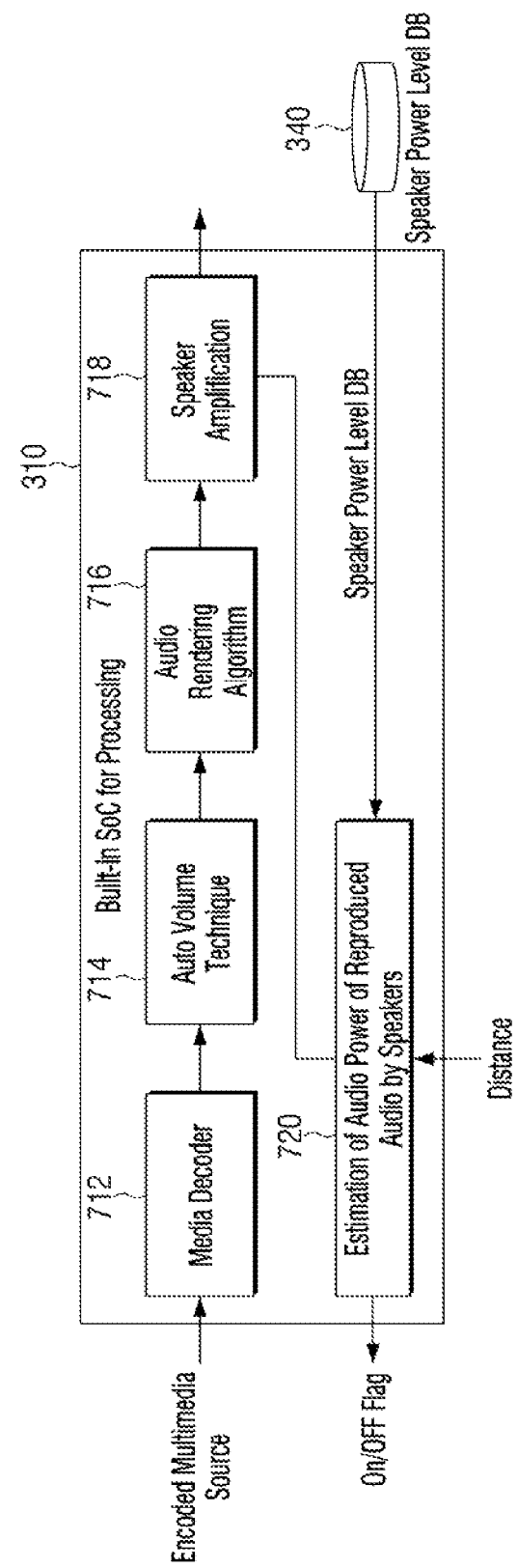
FIG. 7 is a schematic block diagram of a Built-in system on chip (SoC) for processing included in a first electronic device according to an embodiment.

FIG. 7 is a schematic block diagram showing a Built-in SoC for processing performed by a first electronic device according to an embodiment.

Referring to FIG. 7, the Built-in SoC for processing 310 may include a Media Decoder 712, an Auto Volume Technique 714, an Audio Rendering Algorithm 716, a Speaker Amplification 718, and an Estimation of Audio Power of Reproduced Audio by Speaker 720. However, the disclosure is not limited thereto. The Built-in SoC for processing 310 may further include elements, or may not include a portion of the elements.

According to an embodiment, the Media Decoder 712 may obtain a media content capable of being played back by obtaining an encoded multimedia source and performing a decoding operation. The Media Decoder 712 may receive the encoded multimedia source in which the output level of the audio signal is different for respective broadcast channels. The Auto Volume Technique 714 may control the output level of the audio signal included in the respective decoded media content. For example, the Auto Volume Technique 714 may control the output level of the audio signal included in the media content to a digital level of between −1 and +1.

According to an embodiment, the Audio Rendering Algorithm 716 may control the audio signal according to the mode in which the first electronic device 10 outputs the audio signal (e.g., movie playback mode, news playback mode, music appreciation mode, etc.). The Speaker Amplification 718 may amplify the audio signal.

According to an embodiment, the Estimation of Audio Power of Reproduced Audio by Speaker 720 may apply the spacing distance between the first electronic device 10 and the second electronic device 20 obtained by using the output level of the audio signal received from the Speaker Amplification 718 and the Bluetooth signal to data which matched the digitalized audio output level received from the Speaker Reproduction Level DB 340 and the audio input level expected to be obtained through the microphone included in the second electronic device 20 with the lookup table and obtain an ON/OFF Flag on the voice reception possibility of the second electronic device 20, and transmit to the second electronic device 20. The ON/OFF Flag on the voice reception possibility of the second electronic device 20 may correspond to the voice reception notification in which the voice reception possibility of the second electronic device 20 as described in FIG. 1 is determined.

Figure 8:
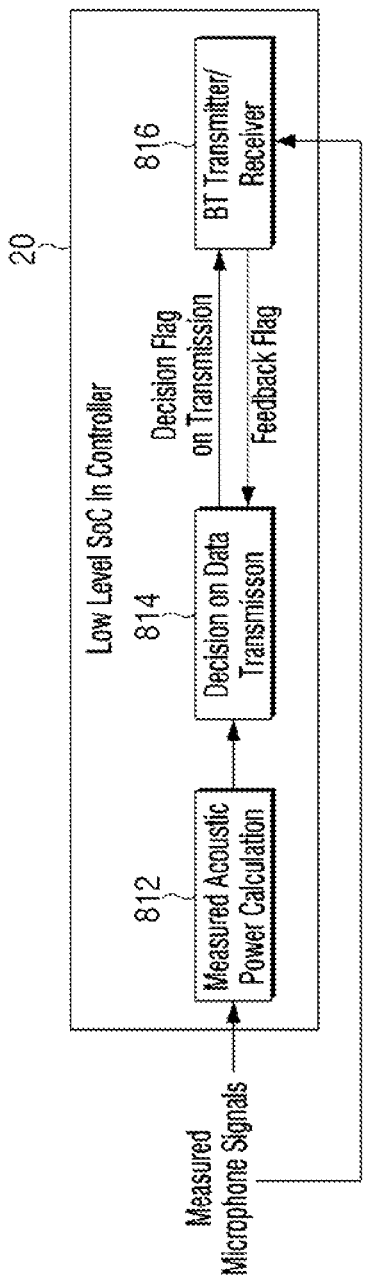
FIG. 8 is a diagram of a second electronic device identifying voice reception possibility of a second electronic device by using an obtained audio according to an embodiment.

FIG. 8 is a diagram showing a diagram of a second electronic device identifying voice reception possibility of the second electronic device by using an obtained audio according to an embodiment.

Referring to FIG. 8, the second electronic device 20 may include a Measured Acoustic Power Calculation 812, a Decision on Data Transmission 814, and a BT transmitter/Receiver 816.

According an embodiment, the second electronic device 20 may obtain sound generated in the surroundings (e.g., measured microphone signals) of the second electronic device 20. The second electronic device 20 may send the sound obtained for obtaining the sound level to the Measured Acoustic Power Calculation 812. Concurrently or sequentially, the second electronic device 20 may send the sound obtained for transmitting to the first electronic device 10 to the BT transmitter/Receiver 816.

According to an embodiment, the Measured Acoustic Power Calculation 812 may obtain a level of the obtained sound.

According to an embodiment, the BT transmitter/Receiver 816 may transmit the voice reception notification (e.g., Feedback Flag, or ON/OFF Flag on voice reception possibility) in which voice reception possibility of the second electronic device 20 obtained from the first electronic device 10 is determined to the Decision on Data Transmission 814.

According to an embodiment, the Decision on Data Transmission 814 may use the sound volume obtained by the Measured Acoustic Power Calculation 812 and the voice reception notification obtained from the first electronic device 10 to control the voice reception notification.

For example, the first electronic device 10 may identify that the level difference of the user voice obtained by the second electronic device 20 and the audio expected to be obtained by the second electronic device 20 is 20 dB based on the audio volume expected to be obtained by the second electronic device 20 being 50 dB, and the user voice obtained on average by the second electronic device 20 being 70 dB. The first electronic device 10 may transmit the voice reception notification (or, ON Flag on voice reception possibility) including information that the second electronic device 20 is currently capable of voice reception.

The second electronic device 20 may use, for example, the Measured Acoustic Power Calculation 812 to identify that the second electronic device 20 is currently obtaining a sound of 60 dB. The second electronic device 20 may identify that the level difference of the currently input sound and the user voice expected to be obtained is 10 dB based on the user voice obtained on average by the second electronic device 20 being 70 dB.

According to an embodiment, the second electronic device 20 may change the voice reception notification received from the first electronic device 10 based on the level difference of the currently input sound and the user voice expected to be obtained being 10 dB. That is, the second electronic device 20 may change the voice reception notification which includes information that voice reception is currently possible received from the first electronic device 10 to the voice reception notification (e.g., Decision Flag on Transmission) which includes information that accurate voice reception is currently not possible and transmit to the first electronic device 10.

According to one or more embodiments, the second electronic device 20 may transmit information that the second electronic device 20 is obtaining a sound of 60 dB to the first electronic device 10. In this case, the first electronic device 10 may transmit the voice reception notification (or, OFF Flag on voice reception possibility) which includes information that the second electronic device 20 is currently incapable of accurate voice reception based on information that the level difference of user voice obtained by the second electronic device 20 and the sound of the first electronic device 10 obtained by the second electronic device 20 is 10 dB.

As described above, according to an embodiment, the second electronic device 20 may change the voice reception notification according to the obtained surrounding sound volume of the second electronic device 20.

Figure 9:
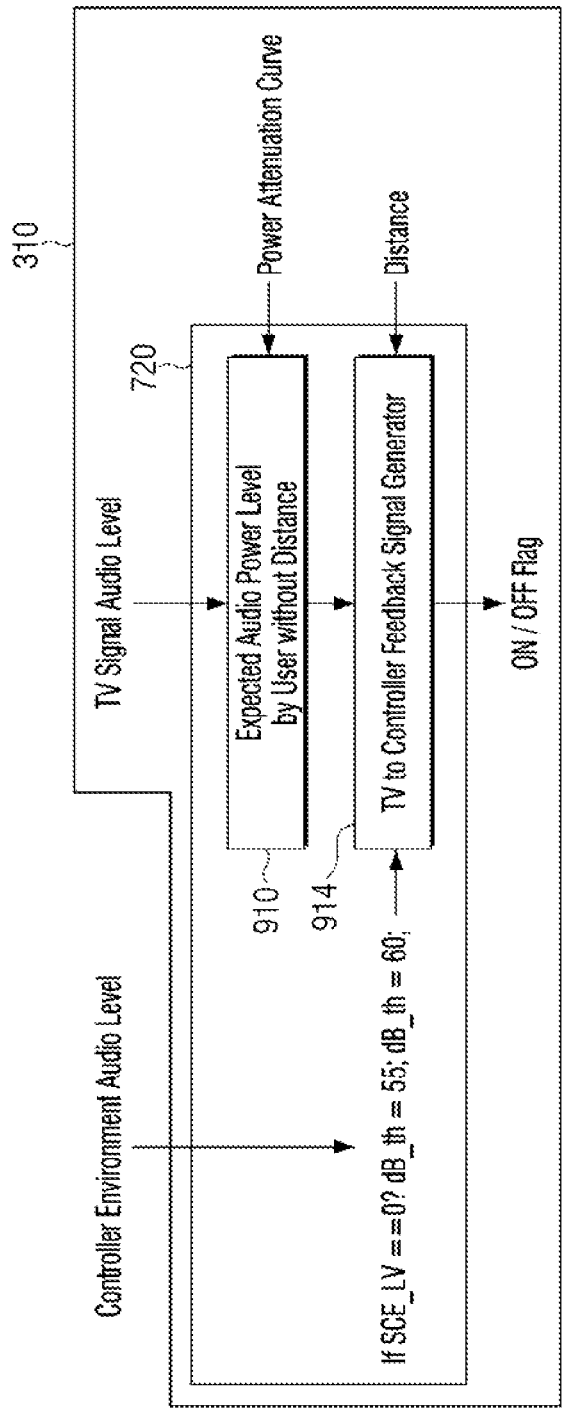
FIG. 9 is a diagram of an estimation of audio power of reproduced sound by speakers for identifying voice reception possibility of a second electronic device by using information obtained from the second electronic device according to an embodiment.

FIG. 9 is a diagram illustrating an operation of an Estimation of Sound Power of Reproduced Sound by Speaker identifying voice reception possibility of a second electronic device by using information obtained from the second electronic device according to an embodiment.

Referring to FIG. 9, the Estimation of Sound Power of Reproduced Sound by Speaker (e.g., Estimation of Sound (or Audio) Power of Reproduced Sound (or Audio) by Speaker 720 of FIG. 7) may include an Expected Audio Power Level by User without Distance 910, and a TV to controller Feedback Signal Generator 914. Hereinbelow, the "controller" may correspond to the above-described second electronic device 20, and the "TV" may correspond to the above-described first electronic device 10.

According to an embodiment, the Estimation of Sound Power of Reproduced Sound by Speaker 720 may obtain the sound (or, sound level (e.g., Controller Environment Audio Level)) obtained by the controller, and identify whether the received sound level is within a threshold range capable of voice reception. The Estimation of Sound Power of Reproduced Sound by Speaker 720 may identify, for example, whether the sound level obtained by the controller is included in the threshold range (exceeding 55 dB and less than 60 dB).

According to an embodiment, the Expected Audio Power Level by User without Distance 910 may store a DB on the audio output level expected to be obtained through the microphone included in the controller according to the audio output level of the TV. For example, the TV may generate a DB which is stored in the Expected Audio Power Level by User without Distance 910 through the audio output level (e.g., TV Signal Audio Level) of the TV and a Power Attenuation Curve.

According to an embodiment, the TV to controller Feedback Signal Generator 914 may use the DB stored in the Expected Audio Power Level by User without Distance 910 and the obtained spacing distance (e.g., distance) between the TV and the controller to generate the voice reception notification (e.g., ON/OFF Flag on voice reception possibility). In this case, the TV to controller Feedback Signal Generator 914 may generate the voice reception notification taking into consideration a result determining whether the sound level obtained by the controller is included in the threshold range.

For example, when the sound level obtained by the controller is higher than the audio output level expected to be obtained through the microphone included in the controller which is derived by using the spacing distance (e.g., distance) between the TV and the controller obtained by the TV and the DB stored in the Expected Audio Power Level by User without Distance 910, the TV to controller Feedback Signal Generator 914 may identify as noise being generated in the surrounding of the controller, and generate the voice reception notification which includes the controller being in a state incapable of obtaining an accurate user voice.

For example, when the sound level obtained by the controller is lower than the audio output level expected to be obtained through the microphone included in the controller which is derived by using the spacing distance (e.g., distance) between the TV and the controller obtained by the TV and the DB stored in the Expected Audio Power Level by User without Distance 910, the controller may be identified as being in a location in which sound is difficult to obtain, and generate the voice reception notification which includes that the controller is in a state incapable of obtaining an accurate user voice.

Figure 10:
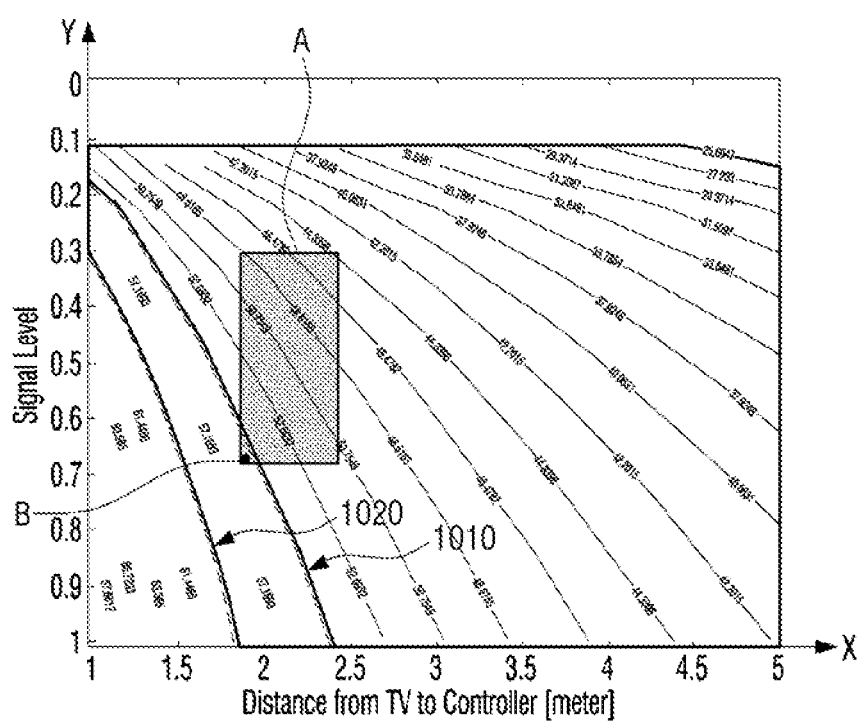
FIG. 10 is a graph of an audio output level which is expected to be obtained through a microphone included in a controller according to an audio output level of a TV according to an embodiment.

FIG. 10 is a graph showing an audio output level which is expected to be obtained through a microphone included in a controller according to an audio output level of a TV according to an embodiment.

The X-axis of FIG. 10 may be the distance between the TV and the controller. The spacing distance between the TV and the controller may, for example, be displayed in meters (m). The Y-axis may be the audio output level of the TV. The audio output level of the TV may, for example, be displayed as between 0.1 and 1. A Contour Plot which is displayed on the graph may be generated by using a TV Signal Audio Level with a Power Attenuation Curve. The Contour Plot may display the audio output level which is expected to be obtained through the microphone included in the controller at respective points.

Referring to FIG. 10, when the distance between the TV and the controller is fixed, the audio output level which is expected to be obtained through the microphone included in the controller may increase as the audio output level of the TV gets bigger (i.e., when the number increases from 0.1 to 1). In addition, when the audio output level of the TV is fixed, the audio output level expected to be obtained through the microphone included in the controller may decrease as the distance between the TV and the controller increases.

According to an embodiment, the TV may set a first area 1010 in the graph of FIG. 10 to a state in which voice reception is possible by the controller.

According to one or more embodiments, the TV may use information on the sound (e.g., obtained sound level) obtained by the controller by using the microphone included in the controller and change the voice reception possibility area of the controller.

For example, the TV may identify that a user mainly views the TV in the range of box A. The TV may identify that the user mainly positions the controller at a distance of 1.8 m to 2.4 m from the TV, and views the TV. In addition, the TV may identify that the user sets the audio output of the TV to the audio output level of about 0.3 to 0.65.

The TV may be configured so that the spacing distance between the TV and the controller is 1.8 m, and identify a situation of outputting audio to an audio output level of about 0.65 (e.g., B area on the graph) as a situation in which the controller is incapable of receiving the accurate voice of the user. In this case, the TV may change a second area 1020 in the graph of FIG. 10 as a state in which the controller is capable of receiving voice. Accordingly, the TV may use data obtained from the controller to change a standard of generating voice reception notification.

Figure 11:
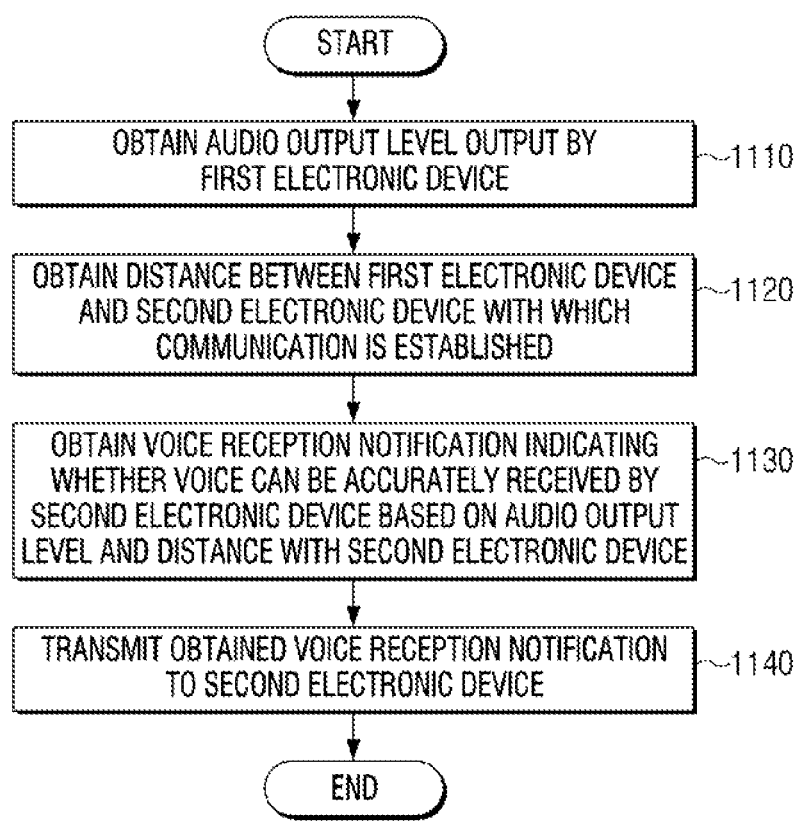
FIG. 11 is a flowchart of a process of a first electronic device obtaining a voice reception notification and transmitting to a second electronic device according to an embodiment.

FIG. 11 is a flowchart of a process of a first electronic device obtaining a voice reception notification and transmitting the voice reception notification to a second electronic device according to an embodiment.

Referring to step 1110, the first electronic device 10 may obtain the audio output level output by the first electronic device 10.

According to an embodiment, the first electronic device 10 may output the audio included in the media content by using the speaker. In this case, the first electronic device 10 may obtain data on the audio output volume which is output through the speaker. For example, the first electronic device 10 may control the audio output level included in the media content to a digital level of between −1 and +1.

Referring to step 1120, the first electronic device 10 may obtain the spacing distance between the first electronic device 10 and the second electronic device 20 with which communication is established.

According to an embodiment, the first electronic device 10 may use the Bluetooth signal strength between the first electronic device 10 and the second electronic device 20 to obtain the spacing distance between the first electronic device 10 and the second electronic device 20.

Referring to step 1130, the first electronic device 10 may use the audio output level and the distance with second electronic device 20 to obtain the voice reception notification which indicates whether the voice can be accurately received by the second electronic device 20.

According to an embodiment, the first electronic device 10 may match the obtained audio output level and the obtained spacing distance with the second electronic device 20 with the audio output level, the spacing distance between the first electronic device 10 and the second electronic device 20, and the audio input level expected to be obtained through the microphone included in the second electronic device 20 and apply to the stored database, and obtain the voice reception notification in which the voice reception possibility of the second electronic device 20 is determined.

Referring to step 1140, the first electronic device 10 may transmit the obtained voice reception notification to the second electronic device 20.

Figure 12:
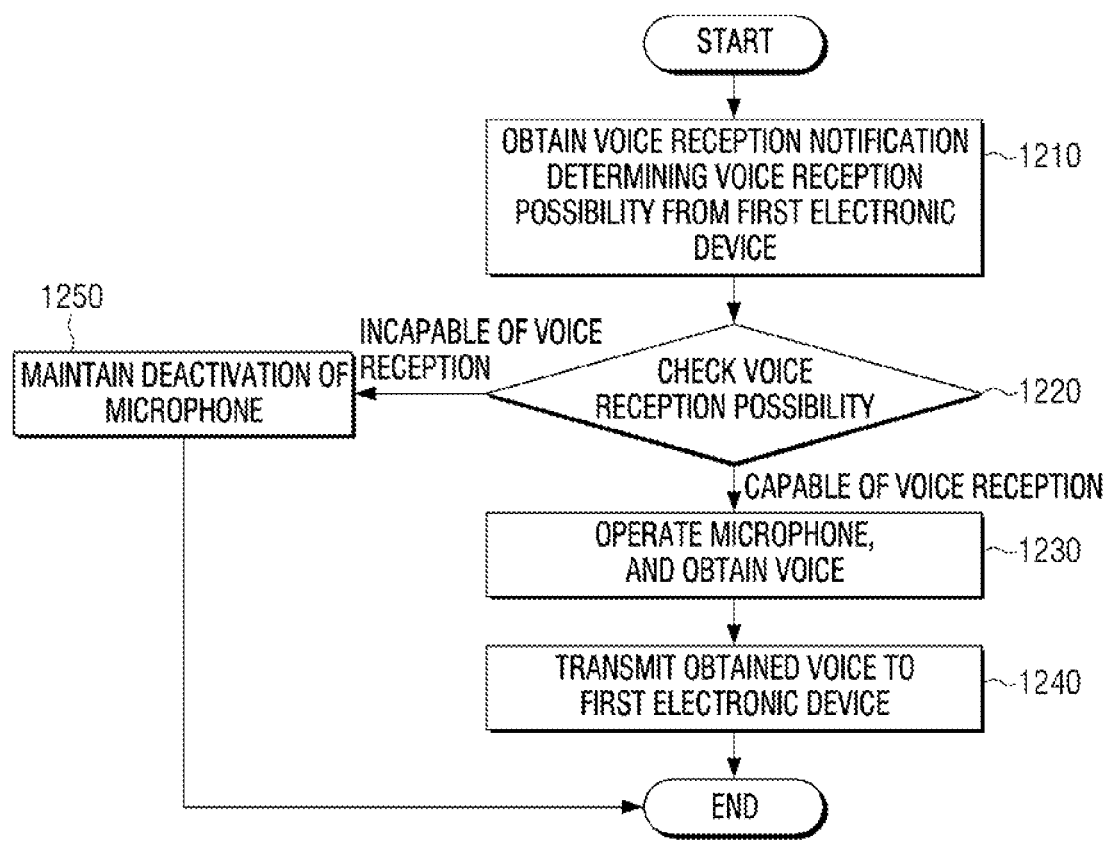
FIG. 12 is a flowchart of a process of a second electronic device obtaining a voice reception notification and changing a setting of the second electronic device according to one or more embodiments.

FIG. 12 is a flowchart of a process of a second electronic device obtaining a voice reception notification and changing a setting of the second electronic device according to one or more embodiments.

Referring to step 1210, the second electronic device 20 may obtain the voice reception notification which includes information on the voice reception possibility from the first electronic device 10.

Referring to step 1220, the second electronic device 20 may identify the content included in the voice reception notification.

According to an embodiment, the voice reception notification may include an instruction to cause the second electronic device 20 to turn-on or turn-off the microphone. Alternatively, the voice reception notification may include an instruction to active or deactivate the voice reception function by the second electronic device 20. Alternatively, the voice reception notification may include an instruction instructing to transmit the received voice to the first electronic device 10.

Referring to step 1230, when content identified as the second electronic device 20 being capable of accurate voice reception is included in the voice reception notification, the second electronic device 20 may operate the microphone, and obtain a voice. Alternatively, when content identified as the second electronic device 20 being capable of accurate voice reception is included in the voice reception notification, the second electronic device 20 may activate the voice reception function.

Referring to step 1240, the second electronic device 20 may transmit the obtained voice to the first electronic device 10.

Referring to step 1250, when content identified as the second electronic device 20 being incapable of accurate voice reception is included in the voice reception notification, the second electronic device 20 may maintain the deactivation of the microphone. Alternatively, when content identified as the second electronic device 20 being incapable of accurate voice reception is included in the voice reception notification, the second electronic device 20 may maintain the voice reception function in a deactivated state.

FIG. 13 is a block diagram of a first electronic device according to one or more embodiments.

As shown in FIG. 13, the electronic device 10 may include a processor 2010, a communicator 2020, a display 2060, a memory 2090, a tuner 2015, a detecting part 2030, an inputter/outputter 2040, a video processor 2050, an audio processor 2070, and an audio outputter 2080. However, the embodiment is not limited thereto. The electronic device 10 may further include elements, or may not include a portion of the elements.

The processor 2010 may execute, for example, a software (e.g., program) stored in the memory 2090 to control at least another element (e.g., hardware or software element) of the electronic device 10 connected to the processor 2010, and perform various data processing or calculations. According to an embodiment, as at least a part of the data processing or the calculation, the processor 2010 may load the instruction or data received from the other element to the memory 2090 (e.g., volatile memory), process the instruction or data stored in the memory 2090, and store the result data in the memory (e.g., non-volatile memory).

According to an embodiment, the processor 2010 may obtain the audio output level which is output through the audio outputter, obtain the distance between the second electronic device 20 and the first electronic device 10, use the audio output level and the distance with the second electronic device 20 to obtain the voice reception notification in which the voice reception possibility of the second electronic device 20 is determined, and control the communicator to transmit the obtained voice reception notification to the second electronic device 20.

According to an embodiment, the processor 2010 may include a main processor (e.g., a central processing device or an application processor), and an auxiliary processor (e.g., a graphics processing device, an image signal processor, a sensor hub processor, or a communication processor) capable of being operated independently or together therewith.

Additionally or alternatively, the auxiliary processor may use low energy than the main processor, or set to specialize in the designated function. The auxiliary processor may be implemented separate from the main processor or as a part thereof. The auxiliary processor may control functions related to the at least one element from among the elements of the electronic device 10 or at least a portion of the states, for example, in place of the main processor while the main processor is in an inactive (e.g., sleep) state or together with the main processor while the main processor is in an active (e.g., application execution) state.

The communicator 2020 may connect the electronic device 10 with an external device or an external server by the control of the processor 2010. For example, the communicator 2020 may establish a direct (e.g., wired) communication channel or a wireless communication channel between the electronic device and the external device or the external server, and support performing communication through the established communication channel. The communicator 2020 may be operated independently from the processor 2010 (e.g., application processor), and may include at least one communication processor which supports the direct (e.g., wired) or wireless communication.

According to an embodiment, the communicator 2020 may include a wireless communication module 2021 (e.g., a cellular communication module, a short range wireless communication module, or a global navigation satellite system (GNSS) communication module) or a wired communication module 2022 (e.g., a local area network (LAN) communication module, or a power-line communication module). The corresponding communication module from among the communication modules may communicate with the external server through a first network (e.g., short-range communication network such as Bluetooth, WiFi direct or infrared data association (IrDA)) or a second network (e.g., long-range communication network such as cellular network, internet, or computer network (e.g., LAN or WAN)). The communication modules of these various types may be integrated to one element (e.g., singular chip), or implemented as a plurality of elements (e.g., plurality of chips) separate from one another.

The display 2060 may visually provide information (e.g., UI, etc.) to the outside (e.g., user) of the display device 10. Based on the display 2060 and the touchpad being configured as a touch screen by forming a layer structure, the display 2060 may also be used as an input device other than an output device. The display 2060 may include at least one from among a liquid crystal display, a thin film transistor-liquid crystal display, an organic light-emitting diode, a flexible display, a 3D display, and an electrophoretic display. Then, based on the implementation form of the electronic device 10, the electronic device 10 may include two or more displays 2060.

The tuner 2015 may select the broadcast signal which is received wired or wirelessly by tuning only a frequency of the channel to be received in the electronic device 10 from among the many propagation components through amplification, mixing, resonance, or the like. The broadcast signal may include an audio, a video, and additional information (e.g., electronic program guide (EPG)).

The broadcast signal received through the tuner 2015 may be decoded (e.g., audio decoding, video decoding, or additional information decoding) and separated into the audio, the video, and/or the additional information. The separated audio, video, and/or additional information may be stored in the memory 2090 by the control of the processor 2010. The tuner 2015 of the electronic device 10 may be singular or plural. The tuner 2015 may be implemented as an all-in-one with the electronic device 10 or a separate device having a tuner which connects electrically with the electronic device 10, or as a tuner (not shown) which connects to the inputter/outputter 2040.

The detecting part 2030 may detect the user voice, the user image, or the user interaction, and include a microphone 2031, a camera 2032, and an optical receiver 2033.

The microphone 2031 may receive the voice of the uttered user. The microphone 2031 may convert the received voice to an electrical signal and output to the processor 2010. The camera 2032 may receive an image (e.g., continuing frames) which correspond to a user motion including gestures from a camera recognition range. The optical receiver 2033 may receive an optical signal (including a control signal) which is received from an external control device (e.g., remote control). The optical receiver 2033 may receive an optical signal corresponding to a user input (e.g., touch, pressing, touch gesture, voice, or motion) from the control device. The control signal may be extracted from the received optical signal by the control of the processor 2010.

The inputter/outputter 2040 may receive a video (e.g., moving image, etc.), an audio (e.g., voice, music, etc.), additional information (e.g., EPG, etc.), and the like from the outside of the electronic device 10 by the control of the processor 2010. The inputter/outputter 2040 may include one from among a high-definition multimedia interface port (HMDI port) 2041, a component jack 2042, a PC port 2043, and a USB port 2044. The inputter/outputter 2040 may include a combination of the HDMI port 2041, the component jack 2042, the PC port 2043, and the USB port 2044.

The video processor 2050 may process the image which is to be displayed by the display 2060, and perform various image processing such as decoding, scaling, noise filtering, frame rate conversion, resolution conversion, and the like on the video data.

The audio processor 2070 may perform processing on the audio data. Various processing such as decoding, amplification, noise filtering, or the like on the audio data may be performed in the audio processor 2070.

The audio outputter 2080 may output the audio included in the broadcast signal received through the tuner 2015 by the control of the processor 2010, the audio which is input through the communicator 2020 or the inputter/outputter 2040, and the audio stored in the memory 2090. The audio outputter 2080 may include at least one from among a speaker 2081, a headphone output terminal 2082, or a Sony/Philips Digital Interface (S/PDIF: output terminal) 2083.

The memory 2090 according to an embodiment may store a program for the processing and control of the processor 2010, and store the data which is input to the electronic device 10 or output from the electronic device 10.

The memory 2090 may include a storage medium of at least one type from among a flash memory type, a hard disk type, a multimedia card micro type, a card type memory (e.g., SD or XD memory, etc.), a random access memory (RAM), a static random access memory (SRAM), a read-only memory (ROM), electrically erasable programmable read-only memory (EEPROM), a programmable read-only memory (PROM), a magnetic memory, a magnetic disk, or an optical disk.

According to an embodiment, the memory 2090 may store instructions set to cause the processor 2010 to obtain the audio output level which is output through the audio outputter 2080, obtain the distance between the second electronic device 20 and the first electronic device 10, obtain the voice reception notification in which the voice reception possibility of the second electronic device 20 is determined by using the output level of the audio and the distance with the second electronic device 20, and control the communicator configured to transmit the obtained voice reception notification to the second electronic device 20.

The term "module" used in the disclosure may include a unit configured as a hardware, a software, or a firmware, and may be used interchangeably with terms such as, for example, and without limitation, logic, logic blocks, components, circuits, or the like. "Module" may be a component integrally formed or a minimum unit or a part of the component performing one or more functions. For example, a module may be implemented in the form of an application-specific integrated circuit (ASIC).

The one or more embodiments of the disclosure may be implemented with software (e.g., program) including one or more instructions stored in a machine-readable (e.g., electronic device 10) storage medium (e.g., memory 2090). For example, a processor (e.g., processor 2010) of the machine (e.g., electronic device 10) may call at least one instruction from among the one or more instructions stored in the storage medium, and execute the called instruction. This allows for the machine to be operated to perform at least one function according to the called at least one instruction. The one or more instructions may include a code generated by a compiler or executed by an interpreter. The machine-readable storage medium may be provided in the form of a non-transitory storage medium. Herein, 'non-transitory' means that the storage medium may be a device which is tangible and does not include a signal (e.g., electromagnetic waves), and the term does not differentiate data being semi-permanently stored and data temporarily being stored in the storage medium.

According to an embodiment, a method according to one or more embodiments of the disclosure may be provided or included a computer program product. The computer program product may be exchanged between a seller and a purchaser as a commodity. The computer program product may be distributed in the form of a machine-readable storage medium (e.g., a compact disc read only memory (CD-ROM)), or distributed online (e.g., downloaded or uploaded) through an application store (e.g., PLAYSTORE™) or directly between two user devices. In the case of online distribution, at least a portion of the computer program product may be at least stored temporarily in the machine-readable storage medium such as a server of a manufacturer, a server of an application store, or a memory of a relay server, or temporarily generated.

According to one or more embodiments, respective elements (e.g., a module or a program) of the above-described elements may include a single entity or a plurality of entities. According to one or more embodiments, one or more elements or operations from among the above-described corresponding elements may be omitted or one or more other elements or operations may be further included. Alternatively or additionally, the plurality of elements (e.g., modules or programs) may be integrated as one element. In this case, the integrated element may perform one or more functions of the element of the respective elements identically or similarly as if it is being performed by the corresponding element from among the plurality of elements prior to integration. According to one or more embodiments, operations performed by a module, program, or other element may be performed sequentially, in parallel, repetitively, or in a heuristically manner, or at least one of the operations above may be performed in a different order, omitted, or one or more different operations may be added.

What is claimed is:

1. A first electronic device comprising:
an audio outputter;
a communicator configured to transmit data to and receive data from a second electronic device;
a memory storing one or more instructions and a lookup table that matches audio output levels of an audio that is output through the audio outputter, spacing distances between the first electronic device and the second electronic device, and audio input levels expected to be obtained through a microphone of the second electronic device based on the audio that is output by the audio outputter; and
at least one processor configured to execute the one or more instructions to:
obtain an audio output level of the audio that is output through the audio outputter;
obtain a spacing distance between the second electronic device and the first electronic device;
obtain a voice reception notification indicating whether a voice can be accurately received by the second electronic device based on the obtained audio output level, the obtained spacing distance and the lookup table; and
control the communicator to transmit the obtained voice reception notification to the second electronic device.

2. The first electronic device of claim 1, wherein the voice reception notification comprises at least one from among an instruction instructing the second electronic device to turn-on or turn-off the microphone of the second electronic device, an instruction for activating or deactivating a voice reception function of the second electronic device, and an instruction for instructing the second electronic device to transmit a received voice to the first electronic device or ending the transmission.

3. The first electronic device of claim 1, wherein the at least one processor is further configured to execute the one or more instructions to obtain the spacing distance based on a signal strength of a signal produced by the second electronic device.

4. The first electronic device of claim 1, wherein the at least one processor is further configured to execute the one or more instructions to, based on a sound level obtained by the second electronic device, obtain the voice reception notification indicating whether the voice can be accurately received by the second electronic device.

5. The first electronic device of claim 1, wherein the at least one processor is further configured to execute the one or more instructions to, based on orientation information of the second electronic device, obtain the voice reception notification indicating whether the voice can be accurately received from the second electronic device.

6. The first electronic device of claim 1, wherein the at least one processor is further configured to execute the one or more instructions to control a display to output a guide according to the voice reception notification while transmitting the obtained voice reception notification to the second electronic device.

7. A method of controlling a first electronic device including an audio outputter and storing a lookup table that matches audio output levels of an audio that is output through the audio outputter, spacing distances between the first electronic device and a second electronic device, and audio input levels expected to be obtained through a microphone of the second electronic device based on the audio that is output by the audio outputter, the method comprising:
obtaining an audio output level of the audio that is output through the audio outputter of the first electronic device;
obtaining a spacing distance between the second electronic device, wherein the second electronic device is configured to transmit data to and receive data from the first electronic device;
obtaining a voice reception notification indicating whether a voice can be accurately received by the second electronic device based on the obtained audio output level, the obtained spacing distance and the lookup table; and transmitting the obtained voice reception notification to the second electronic device.

8. The method of claim 7, wherein the voice reception notification comprises at least one from among an instruction instructing the second electronic device to turn-on or turn-off the microphone of the second electronic device, an instruction instructing the second electronic device to activate or deactivate a voice reception function, and an instruction instructing the second electronic device to transmit a received voice to the first electronic device or ending the transmission.

9. The method of claim 7, wherein the method further comprises obtaining the spacing distance based on a signal strength of a signal produced by the second electronic device.

10. The method of claim 7, wherein the method further comprises, based on a sound level obtained by the second electronic device, obtaining the voice reception notification indicating whether the voice can be accurately received the second electronic device.

* * * * *